Patented Jan. 12, 1954

2,666,046

UNITED STATES PATENT OFFICE 2,666,046

COPOLYMER MANUFACTURE

Joseph F. Nelson, Rahway, Robert F. Leary, Cranford, and Lester Marshall Welch, Madison, N. J., assignors to Standard Oil Development Company, a corporation of Delaware No Drawing. Application December 22, 1950,
Serial No. 202,424

10 Claims. (Cl. 260—88.1)

This invention relates to a new and improved continuous process of manufacturing high molecular weight copolymers by low temperature Friedel-Crafts polymerization.

A representative type of copolymer to which the invention may be applied is one made by copolymerizing about 60% by weight of styrene and 40% of isobutylene at a temperature of about —80 to —105° C. (corresponding to —112 to —157° F.), in the presence of methyl chloride as diluent and solvent and in the presence of a catalyst consisting of a solution of aluminum chloride in methyl chloride.

U. S. Patent 2,274,749 gives a general description of low temperature Friedel-Crafts copolymerization of styrene and isobutylene, or equivalent materials, broadly at any temperature below 0° C. and with proportions of monomers ranging very broadly from about 5 to 95% of either constituent.

However, for the purposes of the present invention, it is desired to use only polymerization temperatures below —50° C., preferably below —80° C., in order to obtain tough flexible copolymers having the desired high molecular weight, as indicated by an average intrinsic viscosity greater than 0.5, such as from 0.6 to 3.0, or preferably greater than 0.7.

For the present invention, it is also desirable to use only proportions of polymerization monomers which will produce a final copolymer having an average of 35 to 70%, preferably 45 to 65%, by weight, of combined styrene, with the balance isobutylene.

Instead of isobutylene, other aliphatic olefins may be used, preferably having more than two carbon atoms, such as propylene, normal butylenes, etc., and preferably iso-olefins having 4 to 8 carbon atoms, such as isopentene (methyl-2-butene-1) or a pentene obtained by dehydration of secondary amyl alcohol.

Instead of styrene, one may use other polymerizable mono-olefinic compounds containing a cyclic nucleus, these materials preferably being vinyl aromatic compounds, and more preferably hydrocarbons. Examples of some of these materials are: alpha-methyl styrene, para-methyl styrene, alpha-methyl para-methyl styrene, para-chlor styrene, dichlor styrenes, indene, para-ethyl styrene, alpha-vinyl naphthalene, etc.

The copolymerization is effected by mixing the two reactants, with or without an inert diluent or solvent, if necessary, such as ethylene, propane, butane, methyl chloride, ethyl chloride, methylene chloride, refined naphtha, etc., and then after cooling the reactants to the desired low temperature, adding an active halide catalyst such as boron fluoride, or activated boron fluoride catalyst (about 0.2 wt. per cent ether based on the boron fluoride), aluminum chloride, titanium tetrachloride, aluminum alkoxide-aluminum chloride complex ($AlCl_3.Al(OC_2H_5)_3$), aluminum bromide, and the like. It is preferable to dissolve the catalyst in a solvent such as a lower alkyl halide, e. g. methyl chloride or ethyl chloride, or carbon disulfide, a low molecular weight sulfur-free saturated hydrocarbon when solubilities allow, or a mixture of methyl chloride wtih butane, and then the catalyst solution is preferably though not necessarily cooled down, filtered, if desired or necessary, and added to the reaction mixture. Alternative catalysts include:

$AlCl_3.AlCl_2OH$, $AlBr_3.AlBr_2OH$, $AlBr_2Cl.AlOCl$,
$AlBrCl_2.AlOBr$, $TiCl_4.AlCl_2OH$, $TiOCl_2.TiCl_4$, $AlBr_3.Br_2.CS_2$, $BF_3$ isopropyl alcohol, $BF_3$ solution in ethylene, activated $BF_3$ catalyst in methyl chloride solution. Volatile solvents or diluents, e. g. ethane, ethylene, methyl chloride, carbon dioxide (liquid or solid), etc. may also serve as internal or external refrigerant to carry off the liberated heat of polymerization. Propane can be used as refrigerant if vacuum is used to remove it.

After completion of the copolymerization, residual catalyst may be inactivated with water or alcohol, for example, isopropyl, and the catalyst is subjected to removal by washing the product with water or also with dilute aqueous caustic soda. The resulting solid copolymer is a tough, thermoplastic resinous solid.

Styrene-isobutylene copolymers having, for instance, a combined styrene content of about 50 to 60% by weight and having an intrinsic viscosity of 0.6 to 1.0 or more, and having a suitable combination of high tensile strength, e. g. 1000 to 2000 lbs./sq. in. or higher, and tough thermoplastic characteristics which permit them to be sheeted out into thin, self-supporting films, or extruded, molded or otherwise shaped, have been successfully made by the above-described polymerization process, using batch operation where the reactants are placed in a reactor with diluent and enough catalyst added, and permitting reaction to continue to 100% conversion, e. g. complete reaction of the polymerizable materials.

However, difficulties have attended efforts to make such copolymers by a continuous polymerization process. For instance, if enough catalyst is used to drive the polymerization to 100% conversion, the resulting copolymer, for instance, having 60% combined styrene, has an excessively low intrinsic viscosity, e. g. about 0.25 to 0.30, even though the polymerization was effected at a relatively low temperature, e. g. −130° F. On the other hand, if a continuous polymerization process is carried out in a single stage, with less catalyst and shorter time in the reactor so as to stop the reaction short of completion, the resulting copolymer, for similar percentage of styrene in the polymerization feed, and similar temperature, will have materially higher intrinsic viscosity, e. g. about 0.5 for 80% conversion, about 0.75 for 50% conversion, or about 0.95 for 30% conversion, but all of such partial conversion operations involve the commercial disadvantage of recovering, purifying and recycling unpolymerized raw materials, and there are a number of other disadvantages.

On the other hand, batch polymerization can readily be made to give a fairly high intrinsic viscosity, e. g. about 0.95, and good hardness with 100% conversion, but batch polymerization is attended with other disadvantages, such as the necessity of frequent charging and discharging of reactors, and the difficulty of avoiding excessive leakage and loss of methyl chloride or other volatile solvents used, and numerous other disadvantages from a practical operating point of view.

A substantial improvement in continuous manufacture of such copolymers was attained by using a multiple-stage continuous operation in which the polymerization reactants, diluent and catalyst are continuously mixed together in a first reactor until partial conversion of about 30 to 70% is obtained, and then the reaction mixture containing polymer and unreacted raw materials is then passed continuously, either by overflow, pumping or by other suitable means into one or more additional reactors. For instance, in a three-stage process, the second stage would be run to a total conversion of about 60 to 90% and in the third stage, the conversion should be as high as possible, e. g. 97 to 100%.

Catalyst is added to each of the several reactors in such a way, i. e. at such a rate as to effect the desired partial conversion in the first reactor, and then complete or essentially complete conversion in the third reactor.

However, the final product of such a 3-stage continuous process, although having a satisfactorily high intrinsic viscosity, also is softer than desired as is evident from a lower Williams plasticity at 60° C. than is obtained with a product of similar combined styrene content but made by a batch polymerization. For instance, a styrene-isobutylene copolymer of 60% average combined styrene made by the 3-stage continuous operation has a Williams plasticity (at 60° C.) in the range of 290 to 360, whereas 375 or higher is desired, and can be obtained in batch operation.

An attempt has been made to improve the above-described 3-stage process by adding styrene to the last stage, or by leaving part of the styrene out of the first stage and adding it to the last stage, but this was not successful in obtaining the desired increase in the Williams plasticity. Also, some of the isobutylene has been left out of the first stage and added to the third stage, but this likewise did not give the desired increase in Williams plasticity.

According to the present invention, when using a 3-stage continuous process, a considerable excess of styrene is either added in the second stage and correspondingly withheld from the first stage or in effect extra styrene is added in the first stage by withholding isobutylene from that stage and adding the extra isobutylene in the second stage. Thus, to make a final copolymer having an average combined styrene content of 40 to 70%, preferably 50 to 65% by weight, a copolymer having an average of 35 to 75%, preferably 40–65%, of the desired final average per cent of combined styrene should be produced in one but only one of the first two stages, and a copolymer having an average of about 115–135%, preferably about 120–130%, of the desired final average per cent of the combined styrene should be produced in the other one of the first two stages, and then in the third stage, which is preferably used, a copolymer is made having an average of about 90–140% of the desired final average per cent of styrene.

In carrying out this improved 3-stage continuous process, the amount of incremental conversion of monomers to polymer in the several stages should generally be about 30 to 55% by weight, preferably 35 to 50%, in the first stage, about 15–55%, preferably 25–45% in the second stage, and about 5–35%, preferably 10 to 30% by weight in the last stage. On a cumulative basis, these figures correspond to about 30–55%, preferably 35–50% in the first stage, about 65–95%, preferably 70–90% in the second stage, and about 95–100%, preferably 98–100% in the last, i. e. third stage.

When the invention is applied specifically to the preparation of a copolymer having a final average combined styrene content of about 60% by weight, and the modification of the invention is used in which excess styrene is injected in the second stage and is correspondingly withheld from the first stage, the actual copolymers produced in the several stages should contain about 20 to 40% of combined styrene in the first stage, about 70–80% combined styrene in the second stage, and 80 to 85% combined styrene in the third stage. On the other hand, if the modification of the invention is to be used in which extra isobutylene is injected in the second stage and is correspondingly withheld from the first stage (this method having substantially the same effect as withholding styrene from the second stage and injecting excess styrene in the first stage), then the copolymers actually produced in the three separate stages should have a combined styrene content of about 70 to 80% in the first stage, about 20 to 40% combined styrene in the second stage, and about 55–75% combined styrene in the third stage.

Since the polymerization temperature, the concentration of reacting polymers and diluent, and the catalyst concentration, and perhaps other minor factors, all have a slight effect on the relative rates at which the styrene and isobutylene copolymerize, it is better to regulate the process of the invention according to the composition of the copolymers being obtained in the several stages, and making whatever adjustment is necessary in the relative proportions of styrene and isobutylene in the feed to obtain copolymers of the desired composition in the several stages.

When using the modification of the invention in which extra styrene is injected in the second stage and is withheld from the first stage, which is the preferred modification of the invention, and where, as stated before, it is intended to produce in the first stage a styrene-isobutylene copolymer having 35 to 75% of the desired final average per cent of combined styrene, and to produce in the second stage a copolymer having 115–135% of the desired final average per cent of combined styrene, then the proportions of styrene feed actually fed into the first stage should be about 50 to 90%, preferably about 60 to 85%, of the desired final average per cent by weight of combined styrene in the finished product. Specifically, in case it is desired to make a copolymer having a final average combined styrene content of about 60% by weight, then the proportions of styrene feed actually fed into the first stage should be about 30 to 55%, preferably about 35 to 50% or parts by weight, with the balance, i. e. 70–45, preferably 65–50, parts by weight of isobutylene; then, the amount of additional styrene to be injected in the second stage will be about 15 to 45, preferably about 20 to 35% or parts by weight, based on the total of 100 parts by weight of reactants.

The details and advantages of the invention will be better understood from the following experimental data:

A series of runs were made in which styrene and isobutylene were copolymerized in the general temperature range of −80 to −100° C., using as catalyst a solution of aluminum chloride dissolved in methyl chloride and using liquid ethylene as external refrigerant and using 2 to 5 volumes of methyl chloride as feed diluent, per volume of mixed isobutylene and styrene reactants. These runs were all carried out in an actual 3-stage continuous operation, or in laboratory equipment set up to simulate such 3-stage continuous operation, so that the effects were substantially the same. In these runs, a feed consisting of methyl chloride as diluent, and the hydrocarbon monomers, namely styrene and isobutylene, was fed to the first reactor; the effluent from the first reactor went to the second reactor, and the effluent from the second reactor went to the third reactor; and finally the effluent from the third reactor went to a recovery system where the catalyst is inactivated by addition of water or an alcohol, e. g. isopropyl alcohol, and then the methyl chloride diluent is flashed off, and the resulting copolymer is recovered in a dry form and subjected to various tests, including a chemical analysis by C and H determination and refractive index, as well as physical properties such as intrinsic viscosity (in toluene), Mooney viscosity, and Williams plasticity (at 60° C.).

Of the ten runs made, the first four, identified as Runs A, B, C, and D, do not represent the present invention, but the last six marked Examples 1 to 6 inclusive do represent this invention.

Runs A, B and C represent substantially normal 3-stage operation, i. e. with no withholding of either monomer in the first stage, and no extra injection of either monomer in either of the later stages; whereas in Run D, some styrene was withheld from the first stage and injected into the third stage.

In the runs marked Examples 1 to 6, representing the present invention, Examples 1 and 2 involve withholding some of the isobutylene in the first stage, and then injecting extra isobutylene in the second stage, thus having substantially the same effect as adding extra styrene in the first stage and withholding it from the second stage. In Examples 3 to 6, some styrene was withheld from the first stage, and injected as extra styrene in the second stage. This is the preferred method of operation. Example 6 was run on the same principle as Examples 3 to 5, but was made as an actual continuous 3-stage operation, whereas Runs A to D and 1 to 5 simulated 3-stage continuous operation, but differed therefrom in that the effluent from stage 1 was analyzed, and a feed corresponding to the effluent except for the polymer was synthesized and fed to stage 2, rather than feeding the effluent from stage 1 to stage 2 directly. The feed for stage 3 was correspondingly prepared according to the analysis of the effluent from stage 2, omitting polymer.

In this series of tests, the Williams plasticity data were obtained according to the standard A. S. T. M. test D926–47T, the determinations being made at 60° C. (140° F.). The Mooney values were obtained on the standard Mooney viscometer according to the ASTM test D927–47T, the temperature used being 212° F.

The amount of catalyst to be used in the various stages of the polymerization, according to the present invention, will vary to some extent according to the reactant-diluent ratio, the relative purity of the reactants, and perhaps other minor factors, but chiefly will be purposely varied in order to obtain the desired amount of conversion in the several polymerization stages, as explained heretofore. In the particular series of tests described herebelow, the catalyst used was a solution of aluminum chloride in methyl chloride, having a concentration in the vicinity of about 0.2% by weight. The catalyst efficiency, calculated on the basis of the weight of polymer produced from the particular weight of catalyst used, is relatively higher in the early stages of polymerization while the monomer concentration is relatively high, i. e. before much of the monomer has been converted into polymer; in later stages the catalyst efficiency becomes considerably reduced. In the present series of tests, described herebelow, the catalyst efficiency, expressed in pounds of polymers per pound of catalyst used, was in the range of about 300 to 1000 in the first stage, about 100 to 500 in the second stage, and about 40 to 150 in the third stage. The overall catalyst efficiency was about 200; this means that about 0.5 lbs. of catalyst, i. e. aluminum chloride, was used per 100 lbs. of polymer produced.

TABLE I

*Three-stage continuous manufacture of styrene-isobutylene copolymer containing 60% styrene and 40% isobutylene*

[All runs are 25 weight percent feed in diluent unless otherwise stated.]

| Run No. | Stage | Extra styrene injection — Percent styrene [1] | Extra styrene injection — Stage Withheld | Extra styrene injection — Stage Injected | Percent weight in composite | Percent styrene | I. V. | Mooney | Williams plasticity (at 60° C.) |
|---|---|---|---|---|---|---|---|---|---|
| A[2] | 1 | | | | 44.5 | 52.2 | 0.93 | 52 | 239 |
|  | 2 | | | | 32.1 | 58.3 | 0.97 | 60 | 278 |
|  | 3 | | | | 23.3 | 75.7 | 0.50 | 71 | 359 |
|  |  | | | | Composite | 58.5 | 0.88 | 59 | 310 |
| B | 1 | | | | 34 | 42.5 | 1.42 | | 251 |
|  | 2 | | | | 33 | 60.0 | 1.08 | | 296 |
|  | 3 | | | | 33 | 78.0 | 0.50 | | 401 |
|  |  | | | | Composite | 59.0 | 0.99 | | 361 |
| C | 1 | | | | 44 | 48.0 | 1.22 | | |
|  | 2 | | | | 32.5 | 65.2 | 0.93 | | |
|  | 3 | | | | 23.5 | 79.4 | 0.14 | | |
|  |  | | | | Composite | 61.8 | 0.89 | 56 | 330 |
| D | 1 | 13 | 1 | 3 | 45.4 | 39.4 | 1.04 | 49 | 212 |
|  | 2 | | | | 36.9 | 62.7 | 0.77 | 66 | 301 |
|  | 3 | | | | 17.7 | 89.0 | 0.35 | 175+ | 404 |
|  |  | | | | Composite | 60.0 | 0.77 | 66 | 324 |

[1] Based on total final polymer.
[2] 35% feed in diluent.

TABLE II

*Present invention*

| Ex. No. | Stage | Extra styrene — Percent styrene [1] | Extra styrene — Stage Withheld | Extra styrene — Stage Injected | Conversion percent weight in composite | Percent Styrene | I. V. | Mooney | Williams plasticity (at 60° C.) |
|---|---|---|---|---|---|---|---|---|---|
| 1 | 1 | 20 | 2 | 1 | 40.2 | 70.0 | 1.00 | 81 | 343 |
|  | 2 | | | | 39.4 | 43.7 | 0.95 | 52 | 217 |
|  | 3 | | | | 20.4 | 71.5 | 0.23 | 175+ | 342 |
|  |  | | | | Composite | 60.8 | 0.78 | 58 | 356 |
| 2 | 1 | 25 | 2 | 1 | 43.5 | 79.0 | | 119 | 397 |
|  | 2 | | | | 31.5 | 34.3 | | 53 | 194 |
|  | 3 | | | | 25.0 | 59.1 | | 38 | 195 |
|  |  | | | | Composite | 60.5 | 0.78 | 60 | 386 |
| 3 | 1 | 15 | 1 | 2 | 42.1 | 40.5 | 1.22 | 63 | 240 |
|  | 2 | | | | 36.9 | 73.3 | 0.80 | 87 | 355 |
|  | 3 | | | | 21.0 | 75.7 | 0.30 | 60 | 394 |
|  |  | | | | Composite | 60.9 | 0.82 | 57 | 349 |
| 4 | 1 | 24.5 | 1 | 2 | 45.0 | 36.1 | 0.96 | 51 | 206 |
|  | 2 | | | | 29.1 | 78.2 | | 113 | 395 |
|  | 3 | | | | 25.9 | 80.9 | | 175+ | 401 |
|  |  | | | | Composite | 59.6 | | 69 | 412 |
| 5 | 1 | 33 | 1 | 2 | 36.7 | 24.9 | 1.23 | 65 | 187 |
|  | 2 | | | | 35.7 | 77.1 | 0.92 | 175+ | 401 |
|  | 3 | | | | 27.6 | 84.2 | 0.44 | 175 | 405 |
|  |  | | | | Composite | 60.5 | 0.88 | 83 | 408 |
| 6[2] | | 25 | 1 | 2 | Final product | 59 | | 85 | 392 |

[1] Based on total final polymer.
[2] Actual 3-stage continuous run.

The above data show that with normal three-stage operation, as in Runs A, B and C, when making a styrene-isobutylene copolymer averaging about 60% combined styrene, the composite product will have a Williams plasticity (at 60° C.) of about 310–360. Run B, which gave the best results, was arranged to yield a polymer of somewhat higher I. V. (intrinsic viscosity) than the other runs by splitting the conversion equally among the stages. Heat transfer and viscosity considerations would favor the 45—35—20 distribution of conversion among the stages. Run D shows that if about 13% styrene based on total final polymer is withheld from the first stage and injected into the third stage, no substantial increase in Williams plasticity is obtained.

On the other hand, by operating according to the present invention, Examples 1 and 2, in which 20 and 25% styrene based on total final polymer was in effect added extra in the first stage (by withholding some of the isobutylene from the first stage and adding it to the second stage), show that a substantial improvement in Williams plasticity is obtained, particularly in Example 2 where the Williams plasticity was raised to 386. Even Example 1 represents an improvement over the corresponding normal three-stage operation of the same conversion, distribution and I. V. Examples 3, 4 and 5 show that when 15%, 24.5% and 33% respectively of styrene based on total final polymer is withheld from the first stage and injected into the second stage, according to the preferred modification of the invention, the resulting Williams plasticity figures are respectively, 349, 412, and 408. Also, Example 6 shows that in an actual three-stage continuous run, the withholding of 25% of styrene based on total final polymer from stage 1 and injection into stage 2 resulted in a product having a Williams plasticity of 392 with an 85 Mooney.

Thus, it is apparent that best results are obtained when 20 to 35% of styrene based on total final polymer is withheld from either the first or second stages and injected extra into the other one of these first two stages. All of the tests made under these conditions, namely Examples 2, 4, 5 and 6, gave products having a Williams plasticity above 375, which is the desired minimum.

Thus, it is noted that the present invention obtains a very unexpected improvement in product quality by making purposely a more heterogeneous polymer, and the invention shows that in general to obtain improved Williams plasticity characteristics, non-homogeneous polymers are desired. This is quite contrary to the general teachings of the prior art.

Thus, for instance, in Table I, it is seen that the arithmetic difference between the per cent of styrene in the fraction having the lowest average per cent styrene and the styrene content of the fraction having the next higher styrene content, ranges from 7.2 (58.4—51.2) in Run A, to 23.3 (62.7—39.4) in Run D. On the other hand, in Table II, representing the present invention, the corresponding differences in per cent of styrene range from 26.3 (70.0—43.7) in Example 1 up to 52.2 (77.1—24.9) in Example 5. This indicates a much greater heterogeneity in the polymer compositions of the present invention in which there is a difference of at least 25, and preferably a difference of 30 to 55, per cent styrene between the fraction having the lowest average styrene content and the fraction having the next higher average styrene content. It is understood of course, that each of these fractions, in its own compositional distribution, contains the highest proportion by weight of molecules having that particular average styrene content, and contains successively lesser amounts of molecules having a styrene content below or above that average per cent styrene. It is therefore important, according to the present invention, that there be very substantial gaps in the compositional distribution of the polymer molecules in the composite composition. It is particularly important to have a large gap or difference between the average styrene content of the copolymer fraction made in the stage having the lowest average styrene content, and the average styrene content of the stage making the copolymer of the next higher average styrene content. Thus, there should preferably be a difference of at least 25%, or preferably 30 to 55% between the average styrene content of the polymer made in the first stage and that made in the second stage.

*Example 7*

A large scale continuous three-stage polymerization, analogous to commercial operation, of styrene and isobutylene was carried out to make a copolymer having an average styrene content of 50%. Methyl chloride was the diluent, and the total reactants used amounted to 15% by weight. The catalyst and temperature used were substantially the same as in Example 6. In the several stages, cumulative conversion was 50% in the first stage, 80% at the end of the second stage, and 100% at the end of the third stage. Some of the styrene feed was withheld from the first stage and injected into the second stage, the proportion fed into the first stage being actually 43% by weight. The styrene withheld from the first stage was added to the second stage. The resulting product had a Mooney value of 60±5, and the Williams plasticity value ranged from 350 to 400, which is surprisingly high for a copolymer having an overall average of 50% combined styrene. Slight variation in the proportion of styrene fed in the first stage, indicated that instead of the 43% styrene, good results could be obtained in general with a styrene feed ranging from 41 to 45% in order to have a finished copolymer product having a Williams plasticity value in the desired range for proper processing characteristics.

*Example 8*

A styrene-isobutylene copolymer having an average combined styrene content of 60% was made in a continuous two-stage operation, using a 15% by weight polymerizable hydrocarbon feed in methyl chloride diluent, and conditions otherwise substantially as in Example 6. In this case, a styrene feed of 50% by weight was used in the first stage, meaning that 20% of styrene based on total final polymer was withheld from the first, and injected into the second or last stage. The conversion was 50% in the first stage and 100% at the end of the second stage. The final copolymer product had a Mooney value of 60±5, and a Williams plasticity ranging from 375 to 400.

*Examples 9 and 10*

A series of laboratory runs were made in a manner similar to that described in Tables I and II except that the feed composition was such that a copolymer having an average styrene content of 50% was produced. The data in the following Table III illustrate the effectiveness of styrene injection for improving the Williams plasticity of copolymers containing an average of about 50% styrene:

TABLE III
*Three-stage continuous manufacture of styrene-isobutylene (50—50) copolymers*

| Run | Stage | Percent styrene [1] | Stage | | Conversion weight percent in composite | Percent styrene | I.V. | Mooney | Williams plasticity (at 60° C.) |
|---|---|---|---|---|---|---|---|---|---|
| | | | Withheld | Injected | | | | | |
| E | 1 | None | | | 35.2 | 32.2 | 1.39 | 71 | 233 |
| | 2 | | | | 40.9 | 53.3 | 0.85 | 52 | 239 |
| | 3 | | | | 33.9 | 70.7 | 0.29 | 175+ | 333 |
| | | | | | Composite | 48.7 | 0.89 | 48 | 271 |
| Ex. 9 | 1 | 16.7 | 1 | 2 | 45.8 | 24.9 | 1.23 | 65 | 187 |
| | 2 | | | | 27.5 | 66.9 | 0.75 | 76 | 369 |
| | 3 | | | | 16.7 | 80.9 | 0.21 | 96 | 404 |
| | | | | | Composite | 48.9 | 0.88 | 66 | 359 |
| Ex. 10 | 1 | 25 | 1 | 2 | 48.0 | 24.2 | 0.81 | 33 | 135 |
| | 2 | | | | 31.1 | 68.4 | 0.78 | 80 | 351 |
| | 3 | | | | 20.9 | 82.3 | 0.49 | 165+ | 405 |
| | | | | | Composite | 50.0 | 0.72 | 57 | 383 |

[1] Based on total final polymer.

The above data show that the principles of the invention can be applied just as successfully to the improvement of the Williams plasticity of a styrene-isobutylene copolymer of 50% combined styrene, as well as that of a copolymer of 60% combined styrene previously shown in Tables I and II. Thus, in Table III, where normal three-stage continuous manufacture resulted in a copolymer having a Williams plasticity of 271 (composite sample) a withholding of 16.7% of styrene from the first stage and injecting it into the second stage resulted in a composite product having a Williams plasticity of 359, and the withholding of an even higher amount, namely 25%, of styrene (based on total final polymer) from the first stage and injecting it into the second stage, resulted in a composite product having an even higher Williams plasticity, i. e. 383.

It is not intended that the invention be limited to the specific modifications which have been given above for the sake of illustration, but only by the appended claims in which it is intended to claim all novelty inherent in the invention and all modifications coming within the scope and spirit of the invention.

What is claimed:

1. In a substantially continuous three-stage copolymerization of styrene and isobutylene at a temperature of about −100° F. to −140° F., with about 1 to 10 volumes of methyl chloride per volume of reactants in the feed and in the presence of a Friedel-Crafts catalyst, using proportions of reactants to produce copolymers having an average combined styrene content of about 40 to 70% by weight, and using catalyst additions in the three stages so as to obtain a 30 to 60% conversion of monomers to polymer in the first stage, an additional conversion of 15 to 55% in the second stage, to make a cumulative conversion of 65 to 85% total conversion in the second stage, and making an additional conversion of 15 to 35% in the last stage in order to make a total conversion of 95 to 100% in the last stage, the improvement comprising making in one of the first two stages a copolymer having about 120–130% of the desired final average per cent of combined styrene, and in the other one of the first two stages a copolymer having about 40 to 65% of the desired final average per cent of combined styrene, and in the third stage making a copolymer having about 90 to 140% of the desired final average per cent of combined styrene.

2. In a continuous three-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having an average combined styrene content of about 58 to 62% by weight, and using catalyst additions in the three stages to effect about 35 to 45% conversion of monomers to polymer in the first stage, an additional 25 to 45% conversion in the second stage, making a cumulative conversion of 70 to 80% in the second stage, and a final additional conversion fo 20 to 30% in the third stage, making a total conversion of 98 to 100% in the third stage, the improvement comprising making a copolymer having a combined styrene content of 20 to 40% in the first stage, 70 to 80% in the second stage and about 80 to 85% in the third stage.

3. In a continuous three-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having an average combined styrene content of about 58 to 62% by weight, and using catalyst additions in the three stages to effect about 35 to 45% conversion of monomers to polymer in the first stage, an additional 25 to 45% conversion in the second stage, making a cumulative conversion of 70 to 80% in the second stage, and a final additional conversion of 20 to 30% in the third stage, making a total conversion of 98 to 100% in the third stage, the improvement comprising making a copolymer having a combined styrene content of about 70 to 80% in the first stage, 20 to 40% in the second stage and about 55 to 75% in the third stage.

4. In a continuous three-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having a combined styrene content of about 58 to 62% by weight, the improvement comprising withholding about 20 to 40% of styrene from the first stage, based on the total final polymer, and injecting that same corresponding amount of styrene in the second stage, using an amount of catalyst in the first stage to obtain a conversion of about 30 to 60% of monomers to polymer, whereby a resultant copolymer is produced having a combined styrene content of about 23 to 38% in the first stage, about 75 to 80% in the second stage and about 80 to 85% in the third stage, and whereby the final composite copolymer composition has an average combined styrene content of 58 to 62, a Mooney value at 212° F. of about 65 to 90, and a Williams plasticity at 60° C. of at least 375.

5. In a continuous three-stage copolymerization of styrene and isobutylene at about −100° F. to −140° F. with about 2 to 7 volumes of methyl chloride per volume of styrene and isobutylene in the feed and in the presence of a Friedel-Crafts catalyst, using proportions of reactants to produce a copolymer having a combined styrene content of about 48 to 52% by weight, the improvement comprising withholding about 15 to 30% of styrene from the first stage, based on the total final polymer, and injecting that same corresponding amount of styrene in the second stage, using an amount of catalyst in the first stage to obtain a conversion of about 30 to 60% of monomers to polymer, whereby a resultant copolymer is produced having a combined styrene content of about 20 to 30% in the first stage, about 60 to 75% in the second stage and about 75 to 85% in the third stage, and whereby the final composite copolymer composition has an average combined styrene content of about 48 to 52%, and a Williams plasticity at 60° C. of at least 350.

6. Product consisting essentially of three different fractions of styrene-isobutylene copolymers having an average combined styrene content of about 58 to 62% and having a Williams plasticity at 60° C. of at least 375, and an average Mooney value at 212° F. of about 60 to 90, fraction A constituting about 45% by weight of the entire mixture and having a combined styrene content of about 35 to 40, with a Mooney value of about 50 to 55 and a Williams plasticity of about 200 to 210, fraction B constituting about 25 to 30% of the entire mixture, and containing about 75 to 80% combined styrene, with a Mooney value of about 110 to 120, and a Williams plasticity of about 375 to 400, fraction C the balance of the composition of about 25 to 30% by weight, having a combined styrene content of about 80 to 85%, Mooney value of about 170–200, and a Williams plasticity of about 390 to 400, this last being the component of lowest molecular weight, and there being present in the composition not more than a minor amount of copolymer molecules having a combined styrene content of 50 to 65%.

7. In a substantially continuous three-stage copolymerization of an alkene of 3 to 5 carbon atoms, with a polymerizable aromatic compound selected from the group consisting of styrene and methyl and halogen-substituted styrenes, at a temperature of +10° F. to −160° F. with 1 to 10 volumes of inert diluent per volume of reactants in the feed, and in the presence of a Friedel-Crafts catalyst, using proportions of reactants to produce copolymers having an average combined styrene content of about 40 to 70% by weight, and using catalyst additions in the three stages so as to obtain a 30 to 60% conversion of monomers to polymer in the first stage, an additional conversion of 15 to 55% in the second stage, to make a cumulative conversion of 65 to 85% total conversion in the second stage, and making an additional conversion of 15 to 35% in the last stage in order to make a total conversion of 95 to 100% in the last stage, the improvement comprising producing in one but only one of the first two stages a copolymer having 115–135% of the desired final average per cent of combined aromatic constituent, and in the other of the first two stages a copolymer having 35 to 75% of the desired final average per cent of combined aromatic constituent, and in the third stage making a copolymer having 90 to 140% of the desired final average per cent of combined aromatic constituent.

8. Product consisting essentially of a mixture of three different fractions of high molecular weight copolymers of a lower aliphatic mono-olefin with a polymerizable mono-olefinic compound containing a cyclic nucleus, said product having an average of about 40 to 70% of combined cyclic constituent and having an average intrinsic viscosity above 0.5, fraction A constituting about 30 to 60% by weight of the entire mixture and having an average of about 35 to 75% of the over-all average per cent of combined cyclic constituent, fraction B constituting about 15 to 55% of the entire mixture and having an average of about 115 to 135% of the over-all average per cent of combined cyclic constituent, fraction C the balance of the composition of about 5 to 35% by weight, having about 90 to 140% of the over-all average per cent of combined cyclic constituent, and there being present in the over-all composition not more than a minor amount of copolymer molecules having the same amount of combined cyclic constituent as in the average of the entire composition.

9. Product consisting essentially of three different fractions of styrene-isobutylene copolymers having an average combined styrene content of about 58 to 62% and having a Williams plasticity at 60° C. of at least 375, fraction A constituting about 30 to 60% by weight of the entire mixture and having a combined styrene content of about 20 to 40, fraction B constituting about 15 to 55% of the entire mixture, and containing about 70 to 80% combined styrene, fraction C the balance of the composition of about 5 to 35% by weight, having a combined styrene content of about 80 to 85%, this last being the component of lowest molecular weight, and there being present in the composition not more than a minor amount of copolymer molecules having a combined styrene content of 50 to 65%.

10. Product consisting essentially of a mixture of three different fractions of styrene-isobutylene copolymers having an over-all average combined styrene content of about 48 to 52% by weight and having an average Williams plasticity at 60° C. of at least 350, fraction A constituting about 30 to 60% by weight of the entire mixture and having a combined styrene content of about 20 to 35%, fraction B constituting about 15 to 55% of the entire mixture and having an average combined styrene content of about 60 to 70%, and fraction C the balance of the composition of about 5 to 35% by weight having an average combined styrene content of about 75 to 85%, this last fraction being the component of lowest molecular weight, and there being present in the composition not more than a minor amount of copolymer molecules having a combined styrene content of about 48 to 52%.

JOSEPH F. NELSON.
ROBERT F. LEARY.
LESTER MARSHALL WELCH.

References Cited in the file of this patent

UNITED STATES PATENTS

| Number | Name | Date |
|---|---|---|
| 2,394,291 | Calcott | Feb. 5, 1946 |

OTHER REFERENCES

Cunningham: Rubber Age, 187–190 (November 1947).